United States Patent
Stewart (10) Patent No.: US 11,985,164 B2
(45) Date of Patent: *May 14, 2024

(54) ATTACK MITIGATION IN A PACKET-SWITCHED NETWORK

(71) Applicant: Netflix, Inc., Los Gatos, CA (US)

(72) Inventor: Randall Stewart, Davenport, FL (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,877

(22) Filed: Apr. 25, 2023

(65) Prior Publication Data

US 2023/0269270 A1   Aug. 24, 2023

Related U.S. Application Data

(63) Continuation of application No. 17/399,047, filed on Aug. 11, 2021, now Pat. No. 11,683,339, which is a
(Continued)

(51) Int. Cl.
*H04L 9/40* (2022.01)
*H04W 12/10* (2021.01)
(Continued)

(52) U.S. Cl.
CPC ...... *H04L 63/1458* (2013.01); *H04L 63/1425* (2013.01); *H04W 12/108* (2021.01);
(Continued)

(58) Field of Classification Search
CPC ... H04L 9/40; H04L 63/1458; H04L 63/1425; H04L 2463/141; H04L 63/166;
(Continued)

(56) References Cited

U.S. PATENT DOCUMENTS

| 7,251,692 B1 * | 7/2007 | Raz ..................... H04L 63/1458 |
| | | 709/225 |
| 2002/0103916 A1 * | 8/2002 | Chen .................. H04L 63/1416 |
| | | 709/229 |

(Continued)

FOREIGN PATENT DOCUMENTS

CN           101741847 B   * 11/2012   ............. H04L 43/16

OTHER PUBLICATIONS

Australian Examination Report No. 1 for Patent Application 2023203816 mailed on Jun. 29, 2023, 2 pages.
(Continued)

*Primary Examiner* — Jayesh M Jhaveri
(74) *Attorney, Agent, or Firm* — Greenberg Traurig, LLP (57) ABSTRACT

The disclosed computer-implemented method includes applying transport protocol heuristics to selective acknowledgement (SACK) messages received at a network adapter from a network node. The transport protocol heuristics identify threshold values for operational functions that are performed when processing the SACK messages. The method further includes determining, by applying the transport protocol heuristics to the SACK messages received from the network node, that the threshold values for the transport protocol heuristics have been reached. In response to determining that the threshold values have been reached, the method includes identifying the network node as a security threat and taking remedial actions to mitigate the security threat. Various other methods, systems, and computer-readable media are also disclosed.

20 Claims, 6 Drawing Sheets

Related U.S. Application Data continuation of application No. 16/576,556, filed on Sep. 19, 2019, now Pat. No. 11,122,075.

(60) Provisional application No. 62/870,621, filed on Jul. 3, 2019.

(51) Int. Cl.
| | |
|---|---|
| *H04W 12/108* | (2021.01) |
| *H04W 12/122* | (2021.01) |
| *H04W 12/30* | (2021.01) |
| *H04W 12/00* | (2021.01) |
| *H04W 12/102* | (2021.01) |

(52) U.S. Cl.
CPC ..... *H04W 12/122* (2021.01); *H04L 2463/141* (2013.01); *H04W 12/00* (2013.01); *H04W 12/10* (2013.01); *H04W 12/102* (2021.01); *H04W 12/30* (2021.01)

(58) Field of Classification Search
CPC ............ H04L 63/1466; H04W 12/108; H04W 12/122; H04W 12/00; H04W 12/10; H04W 12/102; H04W 12/30
See application file for complete search history.

(56) References Cited

U.S. PATENT DOCUMENTS

| | | | |
|---|---|---|---|
| 2004/0006643 A1* | 1/2004 | Dolson | H04L 67/2804 709/246 |
| 2008/0101234 A1* | 5/2008 | Nakil | H04L 63/1425 370/235 |
| 2012/0117646 A1* | 5/2012 | Yoon | H04L 63/1458 726/22 |
| 2017/0026405 A1* | 1/2017 | Vengalil | H04L 65/65 |

OTHER PUBLICATIONS

Notice of Acceptance for Patent Application mailed Jul. 26, 2023 for Australian Application No. 2023203816, 3 pages.
IN Examination Report for Patent Application No. 202117058670 mailed on Aug. 17, 2023, 7 pages.
Notification of Intention to Grant for European Patent Application No. 20745399.4 mailed on Jul. 12, 2023, 8 pages.
Canadian Office Action for CA Application No. 3143499, mailed Nov. 9, 2023, 4 pages.

* cited by examiner

ATTACK MITIGATION IN A PACKET-SWITCHED NETWORK

CROSS REFERENCE TO RELATED APPLICATION

This application is a continuation of U.S. application Ser. No. 17/399,047, filed 11 Aug. 2021, which is a continuation of U.S. application Ser. No. 16/576,556, filed 19 Sep. 2019, which claims the benefit of U.S. Provisional Application No. 62/870,621, filed 3 Jul. 2019, the disclosures of which are incorporated, in their entirety, by this reference.

BACKGROUND

Every day, vast quantities of data are transmitted all over the world via computer networks. These networks break down data files into smaller data packets which are transmitted over wired and wireless data links. The data packets are transmitted using a variety of protocols. These protocols are often referred to as transport protocols. These transport protocols may specify how the data is to be transferred, including indicating whether it is ok for any of the data packets to be received out of order. In cases where such out-of-order transmissions are permitted, as with the transmission control protocol (TCP), some data packets may be received at an end node outside of a specified sequence. Because the data packets may be received out of order, the end node and server keep track of which packets have arrived and which have not. When data packets arrive at the end node, the end node sends an acknowledgement (ACK) message to the server notifying the server that those data packets have arrived. This notification process, however, is vulnerable to exploits, and may be used by attackers to cripple the functionality of the server.

SUMMARY

As will be described in greater detail below, the present disclosure describes methods and systems that mitigate attacks designed to leverage flaws in the transport protocol acknowledgement system.

In one example, a computer-implemented method for mitigating attacks in a computer networking environment includes applying transport protocol heuristics to selective acknowledgement (SACK) messages received at a network adapter from a network node. The transport protocol heuristics identify threshold values for operational functions that are performed when processing the SACK messages. The method also includes determining, by applying the transport protocol heuristics to the SACK messages received from the network node, that the threshold values for the transport protocol heuristics have been reached. Then, in response to determining that the threshold values have been reached, the method includes identifying the network node as a security threat and taking remedial actions to mitigate the security threat.

In some examples, applying the transport protocol heuristics to the SACK messages includes incrementing various counters associated with the operational functions as the SACK messages are processed. The counters indicate when the threshold values for the transport protocol heuristics have been reached. In some cases, the counters are modified upon receiving an acknowledgement (ACK) message.

In some examples, the security threat is an attacking node that is carrying out an attack against the network computing system. At least one of the remedial actions used to mitigate the security threat includes ignoring at least some of the SACK messages received from the network node.

In some examples, at least one of the threshold values for operational functions that are performed when processing the SACK messages includes an indication of whether an ACK position is to be moved within a sendmap. At least one of the threshold values for operational functions that are performed when processing the SACK messages includes a measurement of how far the ACK position is to be moved within the sendmap. In other cases, at least one of the threshold values for operational functions that are performed when processing the SACK messages includes an indication of how many SACK messages are received within a specified time period.

In some examples, the SACK messages are filtered to remove previously received SACK messages. In some examples, filtering the SACK messages further includes removing duplicate SACK messages. In some examples, at least one of the threshold values for operational functions that are performed when processing the SACK messages includes an indication of how many SACK messages were filtered within a specified time period.

In some examples, determining that the threshold values for the transport protocol heuristics have been reached includes determining that the network node is attempting to acknowledge multiple different send attempts to increase the size of a sendmap. In some examples, a decay factor is added to the sendmap to reduce one or more counters associated with ACK or SACK messages. In some examples, the network node is identified as a security threat while the ACK or SACK messages are being removed. Upon determining that the threshold values are no longer met by the network node, the network node is subsequently removed from being classified as a security threat.

In some examples, the threshold values for operational functions that are performed when processing the SACK messages are dynamically changed based on current operating conditions at the network computing system. In other examples, the threshold values for operational functions that are performed when processing the SACK messages are dynamically changed based on the occurrence of a specified trigger.

In addition, a corresponding network computing system for mitigating attacks in a computer networking environment includes a network adapter that transmits and receives data via a transport protocol, a memory device that at least temporarily stores data received at the network adapter, and a processor that processes at least some of the received data. The processor applies transport protocol heuristics to selective acknowledgement (SACK) messages received at the network adapter from a network node, where the transport protocol heuristics identify threshold values for operational functions that are performed when processing the SACK messages. The processor also determines, by applying the transport protocol heuristics to the SACK messages received from the network node, that the threshold values for the transport protocol heuristics have been reached. Then, in response to determining that the threshold values have been reached, the processor identifies the network node as a security threat and takes remedial actions to mitigate the security threat.

In some examples, the above-described method is encoded as computer-readable instructions on a computer-readable medium. For example, a computer-readable medium includes one or more computer-executable instructions that, when executed by at least one processor of a computing device, cause the computing device to apply one or more transport protocol heuristics to selective acknowledgement (SACK) messages received at the network adapter from a network node, the transport protocol heuristics identifying one or more threshold values for operational functions that are performed when processing the SACK messages; determine, by applying the one or more transport protocol heuristics to the SACK messages received from the network node, that the threshold values for one or more of the transport protocol heuristics have been reached; and in response to determining that one or more of the threshold values have been reached: identify the network node as a security threat; and take one or more remedial actions to mitigate the security threat.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to mitigating attacks in a packet-switched network. As will be explained in greater detail below, embodiments of the present disclosure apply transport protocol heuristics to selective acknowledgement (SACK) messages received at a network adapter from a network node. The transport protocol heuristics identify threshold values for operational functions that are performed when processing the SACK messages. These embodiments also determine, by applying the transport protocol heuristics to the SACK messages received from the network node, that the threshold values for the transport protocol heuristics have been reached. Then, in response to determining that the threshold values have been reached, the network node is identified as a security threat and remedial actions are taken to mitigate the threat.

In traditional packet-switched networks, attackers often attempt to exploit weaknesses in the design of the network. For example, as noted above with regard to the transmission control protocol (TCP), some data packets sent by a server may be received at a recipient out of order. Data packets often take circuitous routes through the internet to reach a destination. Some of the links along this route may be faster than others. As such, some data packets may arrive at the recipient device (e.g., an end node) out of order or may be lost entirely and may never arrive at the recipient device (e.g., due to an overloaded router). Because the data packets are often received out of order, the end node sends acknowledgement messages to the server to keep track of which packets have arrived and which have not. These notations are typically maintained by the server in a sendmap, scoreboard, data tree, or other data structure. As used herein, a "sendmap" refers to a data map that tracks which data has been sent to peer nodes. The sendmap is used to process inbound acknowledgments from these peer nodes. Data trees or other data structures may be used in place of or in addition to sendmaps in the embodiments described herein.

As packets transferred from the server arrive at the end node, the end node sends various types of acknowledgement (ACK) messages to the server to notify the server that those data packets have arrived. Selective ACK (SACK) messages acknowledge receipt of a specific out of order message, while an ACK message acknowledges receipt of all prior messages up to the acknowledged message. Thus, if a file is segmented and transmitted in, for example, 10 different packets, a SACK message transmitted by the recipient end node may indicate that packet 5 has arrived and an ACK message for packet 3 transmitted by the recipient end node may indicate that all packets 1-3 were received. The sendmap may make a note that packets 1-3 and 5 have been received, and that the status of packets 4 and 6-10 is unknown.

In real-world scenarios, of course, many thousands, millions, or billions of different packets may be sent and received during a TCP connection. As such, the server may be receiving very large numbers of ACK and SACK messages. Attackers may take advantage of this fact and try to overload the server by sending a surplus of ACK/SACK messages. By sending large quantities of ACK/SACK messages, the sendmap may grow in size until it becomes unwieldly and the server becomes unresponsive, with all of its computing power being used to maintain the ever-growing sendmap.

Some traditional solutions to thwarting these types of attacks include placing a limit on the total number of sendmap entries. Such solutions simply identify a hard number and disallow the creation of any sendmap entries beyond that number. However, sendmaps operate under the assumption that they will be able to create new entries for each new send and for retransmissions. Because each send needs to be tracked in a TCP connection, if a sendmap entry cannot be created, the server will not send the data packet, thus preventing or severely limiting the amount of data that can be transferred. Other traditional solutions place a limit on the number of sendmap entries that can be allocated with SACKs. If additional SACK messages come in and the limit is hit, the server will begin to throw away SACK information. This degrades the server's performance substantially.

The embodiments described herein avoid these shortcomings by establishing transport protocol heuristics that identify the activities performed by attackers. These transport protocol heuristics are configured to identify these malicious activities without needing to put limits on sendmap entries or placing limits on SACKs. Once established, the transport protocol heuristics watch for certain activities by establishing limits on certain actions that take place when processing data packet acknowledgements. When those limits are reached, the systems described herein take remedial actions including monitoring activities from certain nodes and limiting the number of actions (e.g., sendmap moves) that can be performed for acknowledgement messages received from that node. These embodiments may be used in conjunction with any transport protocol including TCP, User Datagram Protocol (UDP), Reliable Data Protocol (RDP), or other transport protocols.

In some cases, applying the transport protocol heuristics to the SACK messages includes incrementing various counters associated with the operational functions as the SACK messages are processed. The counters indicate when the threshold values for the transport protocol heuristics have been reached. In some cases, the counters are modified upon receiving an acknowledgement (ACK) message.

At least one of the remedial actions used to mitigate the security threat includes ignoring at least some of the SACK messages received from the network node. In some examples, at least one of the threshold values for operational functions that are performed when processing the SACK messages includes an indication of whether an ACK position is to be moved within a sendmap. In other cases, the threshold values include a measurement of how far the ACK position is to be moved within the sendmap. In still other cases, the threshold values include an indication of how many SACK messages are received within a specified time period.

In some cases, the SACK messages are filtered to remove previously received SACK messages or to remove duplicate SACK messages. In some cases, the threshold values include an indication of how many SACK messages were filtered and unfiltered within a specified time period.

In some cases, determining that the threshold values for the transport protocol heuristics have been reached includes determining that the network node is attempting to acknowledge multiple different send attempts to increase the size of a sendmap. In some embodiments, a decay factor is added for the sendmap to reduce outdated ACK or SACK counts before processing a new ACK or SACK message. The network node may be identified as a security threat while the outdated ACK or SACK counts are being reduced. Upon determining that the threshold values are no longer met by the network node, the network node is subsequently removed from being classified as a security threat.

In some cases, the threshold values for operational functions that are performed when processing the SACK messages are dynamically changed based on current operating conditions at the network computing system. In other cases, the threshold values for operational functions that are performed when processing the SACK messages are dynamically changed based on the occurrence of a specified trigger.

Because many of the embodiments described herein may be used with substantially any type of computing network, including distributed networks designed to provide video content to a worldwide audience, various computer network and video distribution systems will initially be described with reference to FIGS. 1-3. These figures will introduce the various networks and distribution methods used to provision video content to users. FIGS. 4-9 will describe more specific embodiments in which transport protocol heuristics are applied to acknowledgement messages sent and received over such networks in order to identify attacking nodes and take remedial actions to mitigate or prevent the attacks.

Figure 1:
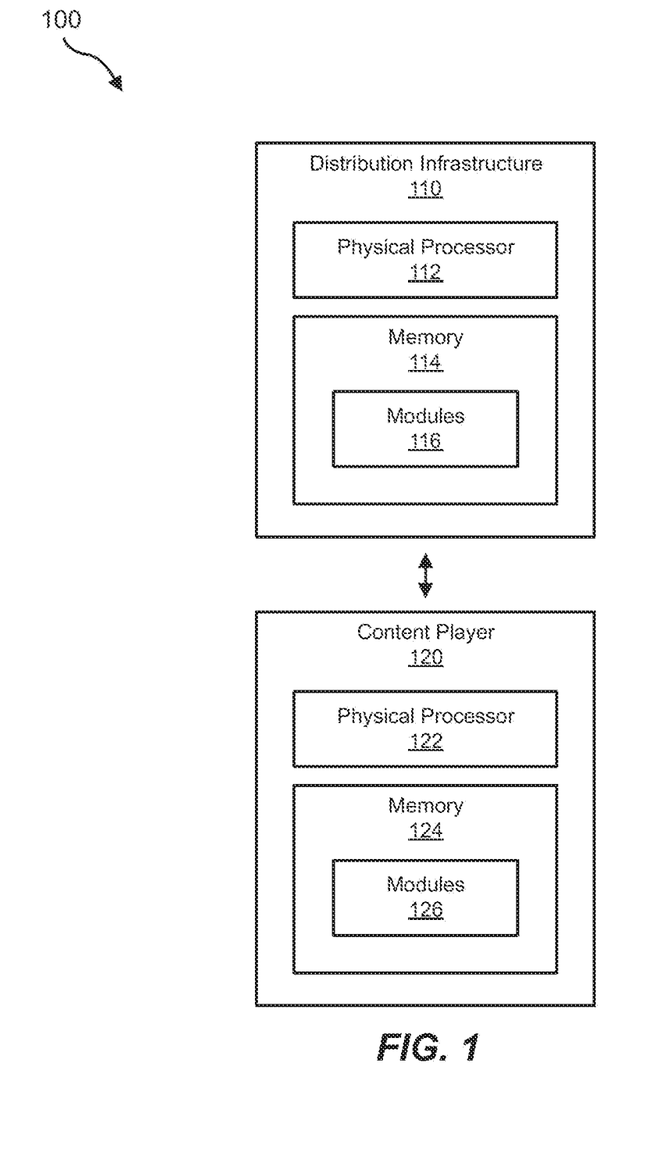
FIG. 1 is a block diagram of an exemplary content distribution ecosystem.

FIG. 1 is a block diagram of a content distribution ecosystem 100 that includes a distribution infrastructure 110 in communication with a content player 120. In some embodiments, distribution infrastructure 110 may be configured to encode data and to transfer the encoded data to content player 120 via data packets. Content player 120 may be configured to receive the encoded data via distribution infrastructure 110 and to decode the data for playback to a user. The data provided by distribution infrastructure 110 may include audio, video, text, images, animations, interactive content, haptic data, virtual or augmented reality data, location data, gaming data, or any other type of data that may be provided via streaming.

Distribution infrastructure 110 generally represents any services, hardware, software, or other infrastructure components configured to deliver content to end users. For example, distribution infrastructure 110 may include content aggregation systems, media transcoding and packaging services, network components (e.g., network adapters), and/or a variety of other types of hardware and software. Distribution infrastructure 110 may be implemented as a highly complex distribution system, a single media server or device, or anything in between. In some examples, regardless of size or complexity, distribution infrastructure 110 may include at least one physical processor 112 and at least one memory device 114. One or more modules 116 may be stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 may include a physical processor 122, memory 124, and one or more modules 126. Some or all of the adaptive streaming processes described herein may be performed or enabled by modules 126, and in some examples, modules 116 of distribution infrastructure 110 may coordinate with modules 126 of content player 120 to provide adaptive streaming of multimedia content.

In certain embodiments, one or more of modules 116 and/or 126 in FIG. 1 may represent one or more software applications or programs that, when executed by a computing device, may cause the computing device to perform one or more tasks. For example, and as will be described in greater detail below, one or more of modules 116 and 126 may represent modules stored and configured to run on one or more general-purpose computing devices. One or more of modules 116 and 126 in FIG. 1 may also represent all or portions of one or more special-purpose computers configured to perform one or more tasks.

In addition, one or more of the modules, processes, algorithms, or steps described herein may transform data, physical devices, and/or representations of physical devices from one form to another. For example, one or more of the modules recited herein may receive defect identification data, transform the defect identification data by preparing the defect identification data for presentation in an interactive user interface, provide the result of the transformation to the interactive user interface, and render the transformed defect identification data on the interactive user interface. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 may access and/or modify one or more of modules 116 and 126, respectively. Additionally or alternatively, physical processors 112 and 122 may execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 may store, load, and/or maintain one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 2:
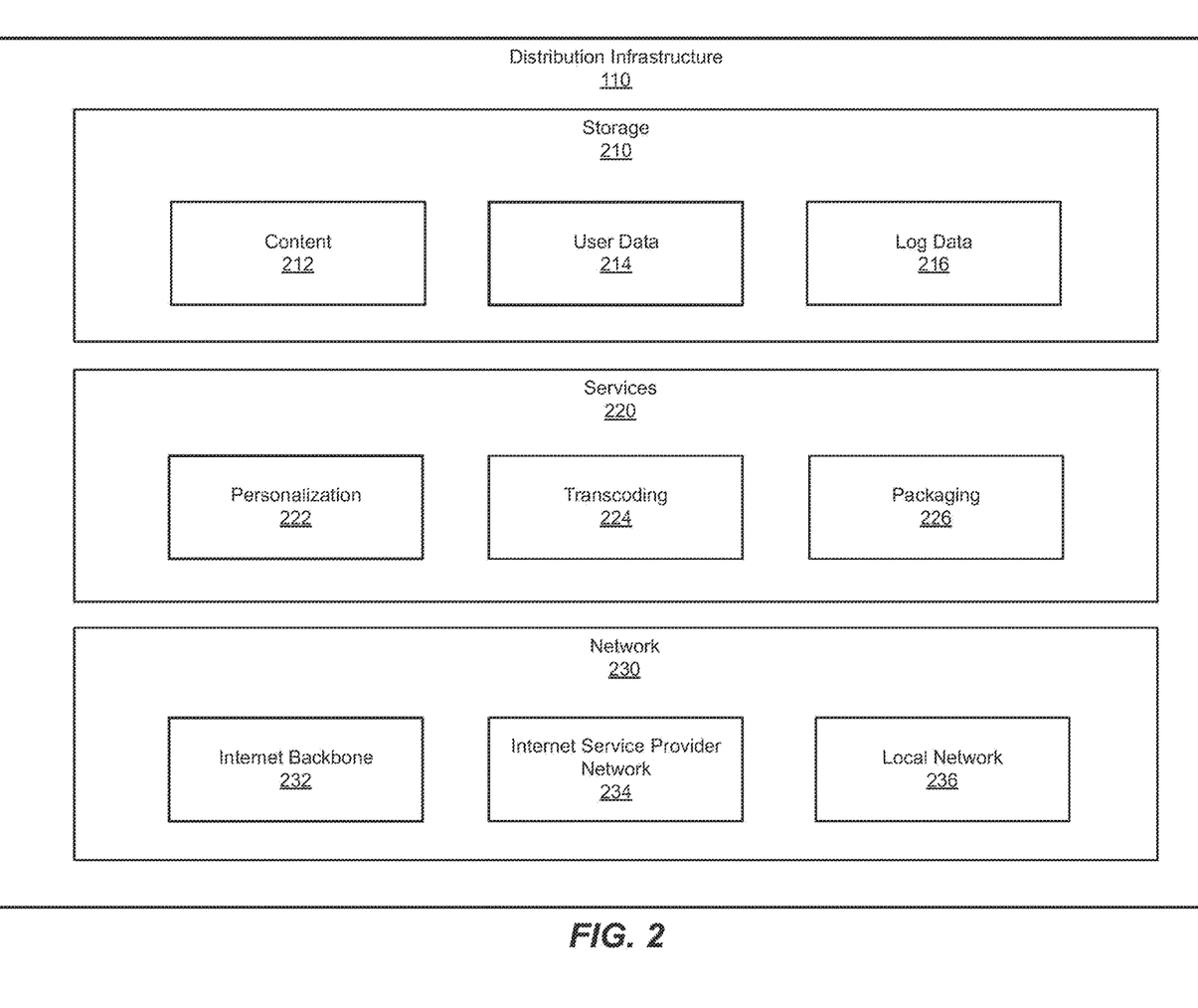
FIG. 2 is a block diagram of an exemplary distribution infrastructure within the content distribution ecosystem shown in FIG. 1.

FIG. 2 is a block diagram of exemplary components of content distribution infrastructure 110 according to certain embodiments. Distribution infrastructure 110 may include storage 210, services 220, and a network 230. Storage 210 generally represents any device, set of devices, and/or systems capable of storing content for delivery to end users. Storage 210 may include a central repository with devices capable of storing terabytes or petabytes of data and/or may include distributed storage systems (e.g., appliances that mirror or cache content at Internet interconnect locations to provide faster access to the mirrored content within certain regions). Storage 210 may also be configured in any other suitable manner.

As shown, storage 210 may store, among other items, content 212, user data 214, and/or log data 216. Content 212 may include television shows, movies, video games, user-generated content, and/or any other suitable type or form of content. User data 214 may include personally identifiable information (PII), payment information, preference settings, language and accessibility settings, and/or any other information associated with a particular user or content player. Log data 216 may include viewing history information, network throughput information, and/or any other metrics associated with a user's connection to or interactions with distribution infrastructure 110.

Services 220 may include personalization services 222, transcoding services 224, and/or packaging services 226. Personalization services 222 may personalize recommendations, content streams, and/or other aspects of a user's experience with distribution infrastructure 110. Encoding services 224 may compress media at different bitrates which may enable real-time switching between different encodings. Packaging services 226 may package encoded video before deploying it to a delivery network, such as network 230, for streaming.

Network 230 generally represents any medium or architecture capable of facilitating communication or data transfer. Network 230 may facilitate communication or data transfer via transport protocols using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 may include an Internet backbone 232, an internet service provider 234, and/or a local network 236.

Figure 3:
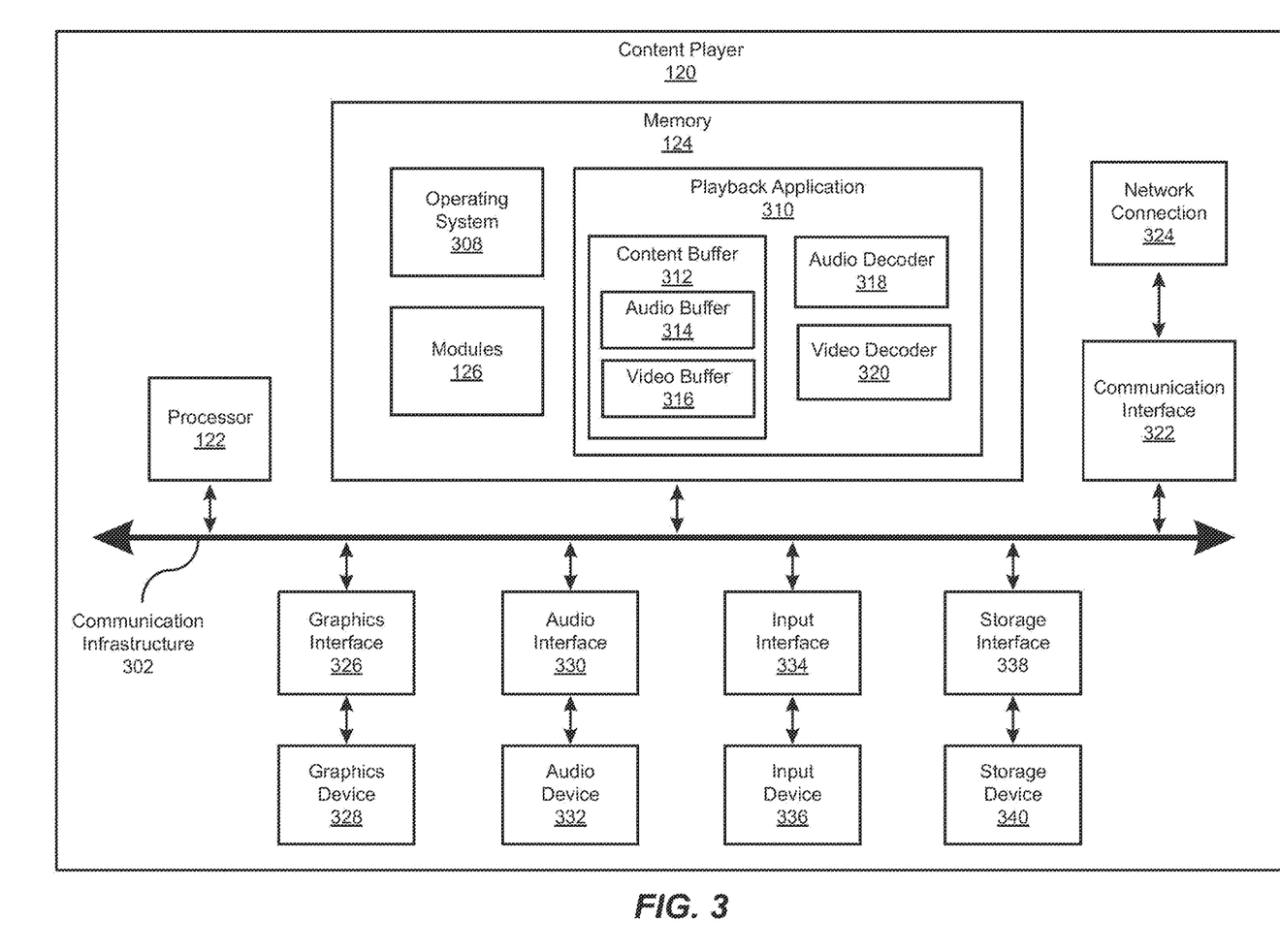
FIG. 3 is a block diagram of an exemplary content player within the content distribution ecosystem shown in FIG. 1.

FIG. 3 is a block diagram of an exemplary implementation of content player 120 of FIG. 1. Content player 120 generally represents any type or form of computing device capable of reading computer-executable instructions. Content player 120 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 may include a communication infrastructure 302 and a communication interface 322 coupled to a network connection 324. Content player 120 may also include a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 may store and/or load an operating system 308 for execution by processor 122. In one example, operating system 308 may include and/or represent software that manages computer hardware and software resources and/or provides common services to computer programs and/or applications on content player 120.

Operating system 308 may perform various system management functions, such as managing hardware components (e.g., graphics interface 326, audio interface 330, input interface 334, and/or storage interface 338). Operating system 308 may also process memory management models for playback application 310. The modules of playback application 310 may include, for example, a content buffer 312, an audio decoder 318, and a video decoder 320.

Playback application 310 may be configured to retrieve digital content via communication interface 322 and play the digital content through graphics interface 326. A video decoder 320 may read units of video data from video buffer 316 and may output the units of video data in a sequence of video frames corresponding in duration to the fixed span of playback time. Reading a unit of video data from video buffer 316 may effectively de-queue the unit of video data from video buffer 316. The sequence of video frames may then be rendered by graphics interface 326 and transmitted to graphics device 328 to be displayed to a user.

In situations where the bandwidth of distribution infrastructure 110 is limited and/or variable, playback application 310 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 120 may also include a storage device 340 coupled to communication infrastructure 302 via a storage interface 338. Storage device 340 generally represent any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems may be included in or connected to content player 120. Conversely, one or more of the components and devices illustrated in FIG. 3 need not be present to practice the embodiments described and/or illustrated herein. The devices and subsystems referenced above may also be interconnected in different ways from that shown in FIG. 3. Content player 120 may also employ any number of software, firmware, and/or hardware configurations.

Figure 4:
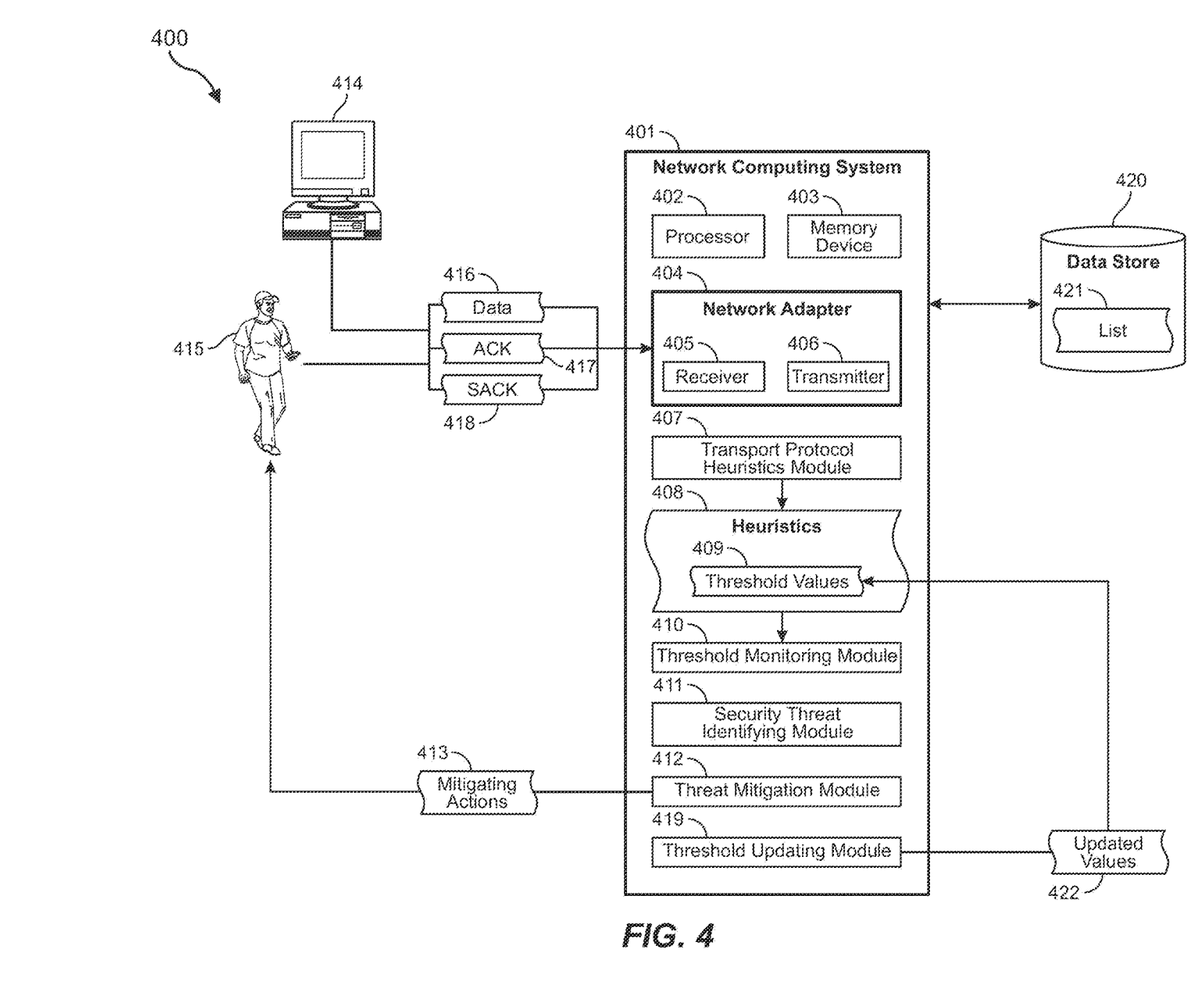
FIG. 4 is a computing environment in which the embodiments described herein operate.

FIG. 4 illustrates a computing environment 400 that includes a network computing system 401. The network computing system 401 may be substantially any type of computing system including a local computing system or a distributed (e.g., cloud) computing system. The network computing system 401 may include at least one processor 402 and at least some system memory 403. The computer system 401 may include program modules for performing a variety of different functions. The program modules may be hardware-based, software-based, or may include a combination of hardware and software. Each program module may use computing hardware and/or software to perform specified functions, including those described herein below.

The network computing system 401 also includes a network adapter 404 that is configured to communicate with other computer systems. The network adapter 404 may include any wired or wireless communication means that can receive and/or transmit data to or from other computer systems. These communication means may include hardware interfaces including Ethernet adapters, WIFI adapters, hardware radios including, for example, a hardware-based receiver 405, a hardware-based transmitter 406, or a combined hardware-based transceiver capable of both receiving and transmitting data. The radios may be cellular radios, Bluetooth radios, global positioning system (GPS) radios, or other types of radios. The network adapter 404 may be configured to interact with databases, mobile computing devices (such as mobile phones or tablets), embedded or other types of computing systems.

The network computing system 401 also includes a transport protocol heuristics module 407. The transport protocol heuristics module 407 generates heuristics 408 with one or more threshold values 409 for those heuristics. For example, when the network computing system 401 processes incoming data 416 including ACK messages 417, SACK messages 418, or other types of acknowledgements (e.g., negative acknowledgments (NACKs), the network computing system 401 takes certain actions. As noted above, one of these actions includes creating or updating a sendmap entry. When a computing system (e.g., personal computer 414 or mobile device 415) sends an ACK 417 or a SACK 418, the network computing system 401 makes updates to its sendmap. In some embodiments, the network computing system 401 also analyzes the heuristics 408 designed to detect malicious activity.

One of these heuristics looks at the ratio of ACK messages to SACK messages sent by a receiving node. For example, if the network computing system 401 is a server transmitting data 416 (e.g., video content) to the user's mobile device 415, that mobile device would send a combination of ACK and SACK messages back to the network computing system 401 over time. The ACK and SACK message are not necessarily sent together, but over time, the network computing system 401 may detect patterns in the ACK-to-SACK ratio. If the mobile device 415 is sending many more SACKs than ACKs, this high ratio of SACKs to ACKs may indicate that the mobile device is an attacking node. At that point, the network computing system 401 either labels the mobile device 415 as an attacking node, or the network computing system waits and analyzes other heuristics related to the mobile device before labeling the device as an attacker.

Another heuristic 408 the network computing system 401 looks at is the number of moves created by the ACK and SACK messages. For example, when an ACK 417 or SACK message 418 is received at the network computing system 401, the system determines whether a pointer in the sendmap needs to be moved along the sendmap, indicating that all previous data packets were received at the end node (e.g., mobile device 415). Moving the pointer requires computation by the network computing system 401 and, thus, excessive moves will require excessive computation. If too many moves are made on a given sendmap, the sendmap moves can overcome the resources of the network computing system 401 and communications may slow to crawl or stop. Thus, in the embodiments described herein, the network computing system 401 monitors the number of sendmap moves caused by each end node. If an end node is causing too many moves, the threat mitigation module 412 of network computing system 401 may stop responding to ACKs and SACKs from that end node or may take other mitigating actions 413. These concepts will be described further below with regard to method 500 of FIG. 5.

Figure 5:
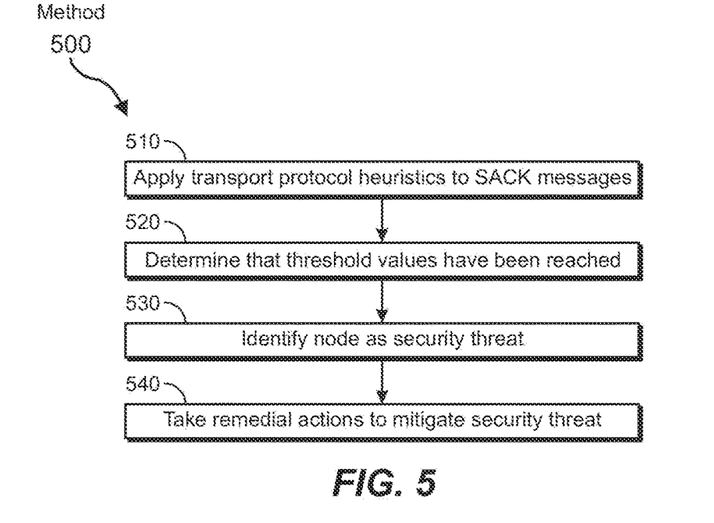
FIG. 5 is a flow diagram of an exemplary method for mitigating attacks in a packet-switched network.

FIG. 5 is a flow diagram of an exemplary computer-implemented method 500 for mitigating attacks in a packet-switched network. The steps shown in FIG. 5 may be performed by any suitable computer-executable code and/or computing system, including the network computing system illustrated in FIG. 4. In one example, each of the steps shown in FIG. 5 may represent an algorithm whose structure includes and/or is represented by multiple sub-steps, examples of which will be provided in greater detail below.

As illustrated at step 510 in method 500 of FIG. 5, the network computing system 401 of FIG. 4 applies one or more transport protocol heuristics 408 to SACK messages 418 received at the network adapter 404 from a network node (e.g., 415). The transport protocol heuristics 408 may identify threshold values 409 for operational functions that are performed when processing the SACK messages. The thresholds may include any one or more of the following: an ACK movement threshold that identifies a threshold number of sendmap pointer moves that are allowed, an ACK-to-SACK threshold that identifies a ratio of ACK messages received to SACK messages, a SACK-to-move threshold that identifies instances where SACK messages cause a sendmap pointer move (or "move" herein) and instances where SACK messages do not cause a move, a restoral threshold that identifies whether a declaration of an attacker was a false-positive, and a map minimum threshold that identifies a minimum count of sendmap entries in a list stored on the network computing system (e.g., list 421 on data store 420). It will be recognized here that many different threshold values 409 may be used in the transport protocol heuristics, and that the threshold values described above are examples of such values and are not intended to be limiting.

At step 520 of method 500, the threshold monitoring module 410 of FIG. 4 determines, by applying the transport protocol heuristics 408 to the SACK messages 418 received from the network node (e.g., 415), that the threshold values 409 for at least one of the transport protocol heuristics have been reached. The threshold monitoring module 410 is configured to monitor the threshold values and determine when those values have been exceeded. In some embodiments, counters are instantiated that correspond to the threshold values. As each message processing event occurs (e.g., a sendmap move event), a counter associated with that action is incremented. After many successive increments, the threshold monitoring module 410 may determine that the counter value has gone beyond the established threshold values 409 for that counter.

In response to determining that one or more of the threshold values 409 have been reached, the security threat identifying module 411, at step 530, identifies the network node (e.g., 415) as a security threat and, at step 540, the threat mitigation module 412 takes one or more remedial, mitigating actions 413 to reduce or eliminate the security threat. The mitigating actions 413 may include responding to fewer of the ACK/SACK messages received from the security threat, entirely ignoring ACK/SACK messages from the security threat, reducing the number or type of actions performed in response to ACK/SACK messages from the security threat (e.g., performing fewer sendmap move operations or creating fewer ACK/SACK entries in the sendmap), filtering ACKs/SACKs, introducing decay factors when processing ACK/SACK messages, or taking other mitigating actions. In some cases, the security threat identifying module 411 continues to monitor a node that has been branded a security threat. Over time, this node may be reclassified as a non-threat if the node's threshold values 409 return to a normal, expected range.

Figure 6:
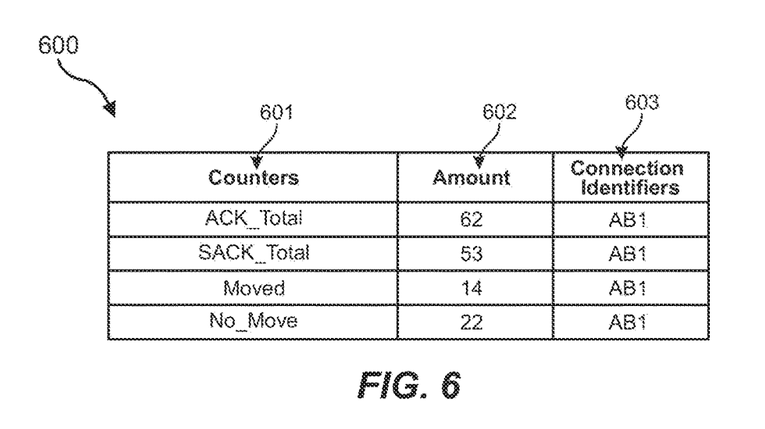
FIG. 6 is a chart identifying various counters, amounts, and connection identifiers.

In some embodiments, as noted above, these threshold values 409 are associated with counters. For example, as shown in FIG. 6 different counters in chart 600 track different actions. When those actions occur (e.g., a sendmap pointer is moved), the counter 601 associated with that action is incremented. The network computing system 401 establishes counters such as an ACK_Total counter that indicates a total number of ACK messages received from a certain node. The connection identifying the sending party and the receiving party may be identified by a connection identifier 603. For instance, if the mobile handheld device 415 of FIG. 4 is identified as "A" and the network computing system 401 is identified as "B," the connection may be referred to as "AB." In cases where those devices have multiple transport protocol connections (either simultaneously or in succession), the connection identifier 603 may include a number such as "AB1" or "AB2," and so on. Thus, a unique set of counters 601 may apply to each connection (e.g., "AB1") between nodes, or the counters may apply to all of the connections between nodes A and B. As such, the counters 601 track the various thresholds over time as communications are transferred back and forth between the server and end node.

In chart 600, the counter ACK_Total indicates how many ACK messages have been received at the network computing node 401, as indicated by amount 602. The current amount is 62, indicating that the network computing node 401 has received 62 ACK messages from node "B." The SACK_Total counter shows a count of 53 received SACK messages, and the Moved counter shows a tally of 14 sendmap pointer moves. A large number of "moves" may indicate that the SACK messages are illegitimate and are part of an attack from a security threat. The No_Move counter tracks the number of times a SACK messages has been received without moving the sendmap pointer. Most SACK messages result in "no moves" and, as such, a low count of "no moves" typically indicates that message transmission is operating normally. When ACK, SACK, or other acknowledgment messages are received at the network computing node 401, the network computing node 401 adds the messages to the totals and notes when sendmap pointers are moved, incrementing the associated counters each time those operational functions are performed. It will be understood that many different types of counters may be instantiated to track different types of messages and different types of actions performed in response to those messages.

Figure 7:
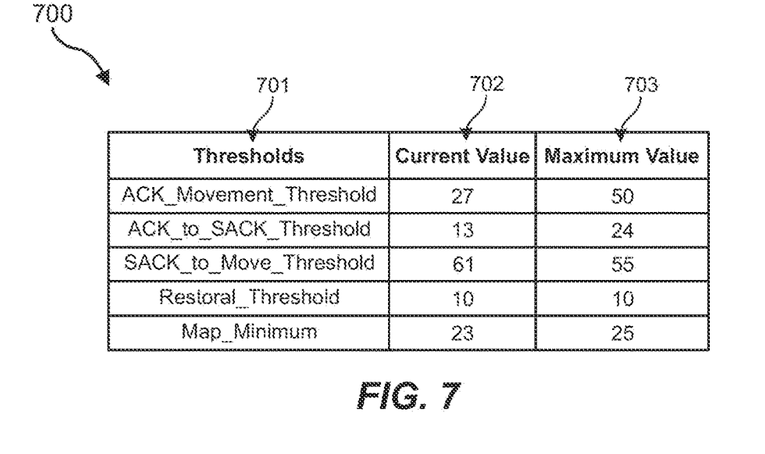
FIG. 7 is a chart identifying various thresholds, current values for those thresholds, and maximum values for those thresholds.

FIG. 7 illustrates a chart 700 with different thresholds 701 and their associated current values 702 and maximum values 703. As the name implies, the current value 702 shows the current value of the counter for the respective threshold. Maximum value 703 indicates the maximum allowed value for that threshold. Once the counter for that threshold value is incremented past the maximum value 703, then the threshold monitoring module 410 of FIG. 4 indicates that the threshold values for that threshold 701 has been reached. Thresholds 701 represent a sampling of potential transport protocol heuristics that may be tracked and monitored by the network computing system 401.

In FIG. 7, the ACK_Movement_Threshold identifies a threshold number of sendmap pointer moves that are allowed within a given timeframe. The current value 702 is 27 indicating that 27 sendmap pointer moves have occurred in a given timeframe or since the occurrence of a specified event. Once the maximum value of 50 has been reached, the security threat identifying module 411 of FIG. 4 will identify the end node (e.g., personal computer 414) as a security threat. An ACK_to_SACK_Threshold identifies a ratio of ACK messages received to SACK messages received from the end node within a specified timeframe or since the occurrence of a specified event. A SACK_to_Move_Threshold identifies instances where SACK messages have caused a sendmap pointer move and instances where SACK messages do not cause a move.

The SACK_to_Move_Threshold may be a percentage (e.g. 61% in FIG. 7) of SACK moves to no-moves and, when that threshold percentage is exceeded, the security threat identifying module 411 will identify the end node as a security threat. A Restoral_Threshold identifies a percentage indicating whether a declaration of an attacker was a false-positive, and a Map_Minimum threshold identifies a minimum count of sendmaps entries that are stored before beginning to determine whether an end node is a security threat. As with the counters identified above, it will be understood that the identified thresholds 701 represent a sampling of potential transport protocol heuristics that may be tracked and monitored by the network computing system 401, and that other thresholds may be used in combination with those listed or as alternatives to those listed.

In some cases, a counter's current value is modified or even reset to zero upon receiving certain types of acknowledgement messages. For example, upon receiving an ACK message 417 from computer system 414, the network computing system 401 may modify a counter that tracks acknowledgment messages such as ACK_Total in counters 601. If an end node is sending an excessive amount of ACK messages or SACK messages, the threshold monitoring module 410 will determine that a threshold has been exceeded, and the security threat identifying module 411 will identify the end node as a threat.

Figure 8A:
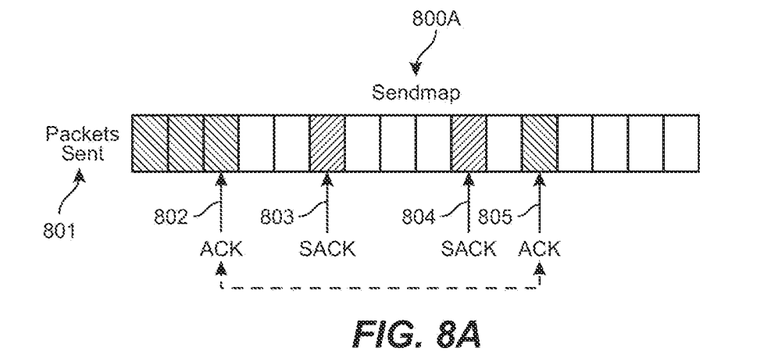
FIGS. 8A and 8B illustrate embodiments of a sendmap that is updated over time.
Figure 8B:
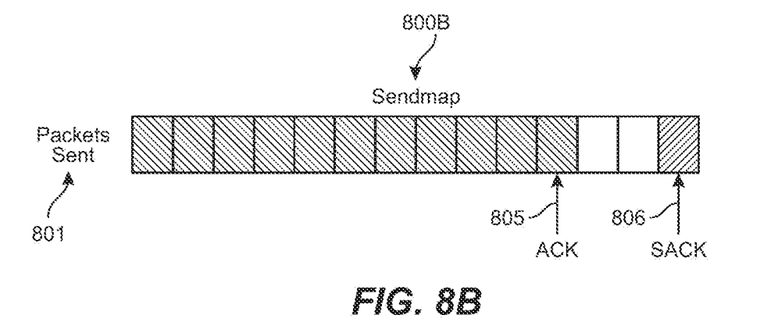

FIG. 8A illustrates an embodiment of a sendmap 800A with multiple entries identifying packets that have been sent 801. When an ACK message is received at the network adapter 404, the network computing system 401 acknowledges each of the previously sent messages up to the ACK message 802. In FIGS. 8A and 8B, acknowledged messages are indicated by backwards slant shading, while selectively acknowledged messages are indicated by forward slant shading, while unacknowledged packets are unshaded. At 803, the network computing system 401 receives a SACK message 803 acknowledging receipt of that packet. SACK message 804 similarly acknowledges receipt of a packet received out of order. When ACK message 805 is received, the ACK indicates that all of the data packets 801 up to the ACK 805 have been received. Thus, as shown in FIG. 8B, all of the packets 801 up to ACK 805 are shaded as acknowledged. Newly received SACK message 806 indicates that another out of order packet has been selectively acknowledged.

When the ACK is moved (as in from 802 to 805), a "Moved" counter is incremented by one. In some embodiments, an excessive amount of sendmap move operations (e.g., beyond the ACK_Movement_Threshold of FIG. 7) indicates that the end node is a security threat and the security threat identifying module 411 labels the end node as a threat. In some cases, the network computing system 401 may determine how far the ACK position is to be moved. In FIG. 8A, the ACK 802 is moved up nine positions to the packet designated by ACK message 805. A large number of short moves received from an end node may indicate a potential attack. As such, one of the operational functions performed when processing the SACK messages includes measuring how far the ACK position is to be moved within the sendmap (e.g., 800A/800B). Still further, if a large number of SACK messages are received in a short period of time, the security threat identifying module 411 will also label the end node as a threat.

Once the network computing system 401 labels an end node as a threat, the threat mitigation module 412 takes various mitigating actions 413 to reduce or eliminate the threat posed by the end node. One mitigating action is to completely cut off communication with the end node. Another mitigating action is to ignore all or some of the SACK messages received from the end node. Another mitigating action is to ignore other types of ACK messages, or only respond to certain ACK messages. By ignoring some or all of these ACK/SACK messages from the end node, the network computing system 401 will cease to spend so many computing resources maintaining the sendmap, thus effectively eliminating this line of attack. The processor 402 continues to operate at a healthy rate and does not overly dedicate itself to processing requests from an attacking node.

Figure 9:
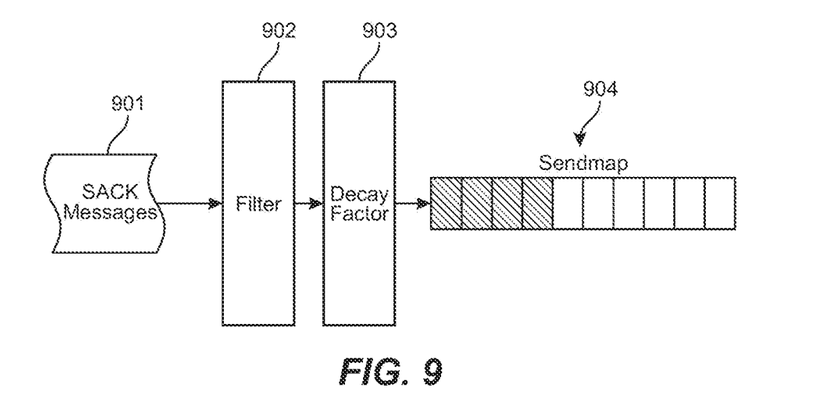
FIG. 9 illustrates an embodiment in which message counters are subject to a decay factor before being applied to a sendmap.

FIG. 9 illustrates an embodiment in which SACK messages are filtered before the SACK message is processed. This filtering may be performed prior to detecting security threats. In one embodiment, the SACK messages 901 are received at a server (e.g., network computing system 401 of FIG. 4). The server applies a filter 902 to filtering one or more of the SACK messages 901 so that the filtered SACK messages are not processed by the server (e.g., the sendmap 904 is not updated). The filter 902 may also be used to remove previously received SACK messages or to remove duplicate SACK messages. The filtered messages are filtered before being processed at the sendmap 904 and, as such, no processing resources are expended processing those messages to update the sendmap. As such, this type of filtering can save a great deal of CPU and memory overhead that would have otherwise been expended processing the SACK messages 901. In some cases, the network computing system 401 tracks how many SACK messages were filtered within a specified time period and use that number to determine if a specific end node is attempting to carry out an attack.

The decay factor 903 is used to identify attacking nodes more quickly. The decay factor 903 is applied to counters (e.g., 702 of FIG. 7) to uniformly reduce the tally of the counters and thereby reduce the amount of time needed to reach a threshold amount. For instance, if an attacker were to send a very large number of ACK's (e.g., 50,000 ACKs) in attempt to quickly increase the size of a sendmap window, the ACK-to-SACK ratio would be very large and, as such, would likely stay well under an established ACK-to-SACK ratio threshold (e.g., 60%). While the ratio is under this threshold, the attacker can continue to send ACK messages to expand the sendmap window. However, by uniformly applying a decay factor 903 to the counters at specified time increments (e.g., every second), the counters are reduced by ½ or by ¼ or by some other ratio.

Because all of the counters are reduced by the same decay ratio, the ACK-to-SACK ratio also remains the same. For instance, in the above example, if 100 SACKs had been received along with the 50,000 ACKs, the ACK-to-SACK ratio would be 50,000:100. If a decay factor of ¼ was applied, the counters would each be reduced to ¼ of their original values, thus 12,500:25. Further reductions in counter values may bring the ACK-to-SACK ratio closer to an established ACK-to-SACK ratio threshold (e.g., 60% ACKs to SACKs). Once the ACK-to-SACK ratio threshold has been reached, the system may take mitigating actions to neutralize the attacker. Arriving at this threshold in a more efficient manner allows the attacker to be identified and stopped more quickly.

In some cases, the security threat identifying module 411 of FIG. 4 is configured to identify an end node (e.g., 415) as a security threat while removing the outdated ACK or SACK messages. For example, the security threat identifying module 411 may consult a counter to determine that the end node 415 is sending a number of ACK/SACK messages that is beyond a threshold amount. The network computing system 401 may ensure that older ACK/SACK message are properly processed before new messages are processed. While the older, perhaps outdated ACK/SACK messages are being processed, the network computing system 401 may simultaneously determine that the end node 415 is a security threat.

In some cases, however, the end node 415 is not intentionally attacking the network computing system 401. For instance, the ACK/SACK messages sent by the end node 415 may be delayed due to a faulty or low-bandwidth network link. For example, the network may be heavily congested or may be experiencing some type of interference. As such, the ACK/SACK messages may arrive in large bunches. The security threat identifying module 411 may label the end node 415 as a security threat and initiate one or more mitigating actions 413. However, the network computing system 401 will continue to monitor the end node 415 and if, over time, the acknowledgement messages sent by node 415 return to normal levels below the established thresholds, security threat identifying module will reclassify the node as no longer a security threat.

Still further, the threshold values themselves may be changed over time. In such cases, end nodes that were classified as exceeding one or more threshold values may no longer exceed those thresholds. As such, the end nodes may be reclassified as non-threats. The threshold values 409 may be changed, for example, due to current operating conditions at the network computing system 401. If the network computing system 401 is under high CPU load, for example, the threshold values 409 may be dynamically lowered. Or, if the network computing system 401 is experiencing light load, the threshold values 409 may be dynamically raised as more computing power is available to process sendmap changes.

In cases where the threshold values are higher, there is a lower chance of falsely identifying an end node as a security threat and downgrading or eliminating their current level of service. For example, if a SACK-to-ACK ratio is set to 99%, it may take longer to identify an attacker, but the network computing system 401 is less likely to have a false detection. Additionally or alternatively, the size of the sendmap (or data tree) may be considered. Most endpoints, for example, that are not experiencing high levels of data loss will have a very small sendmap. As such, if the threshold of the number of sendmap entries needed to even begin monitoring is increased, the increased limit may eliminate a large number of connections that might normally hit a high SACK-to-ACK ratio during loss recovery. However, because the size of the sendmap is still relatively small, the computing burden to maintain that sendmap remains low. And, as such, even though the SACK-to-ACK ratio is comparatively high, because the size is below a certain threshold size, the sending node is not identified as an attacker.

Thus, the network computing system 401 may vary the thresholds values 409 over time and based on different conditions or triggering events. In some cases, the threshold values for each counter are spelled out in policies. These policies may be updated by the threshold updating module 419 of FIG. 4. The updated threshold values 422 specified in the policies are then implemented by the threshold monitoring module 410 when determining whether a threshold value has been exceeded. The threshold values may also be varied to change how fast attackers are identified or how fast a non-threatening node with a bad connection supplying a high number of ACKs/SACKs is properly categorized as a non-threat. Thus, the threshold values may be set and forgotten, or may be dynamically varied based on current conditions such as CPU or memory bandwidth or the occurrence of a specified triggering event (e.g., receiving packets from a node in a specified country or from a specified browser or from a certain bank of IP addresses, etc.).

In one embodiment, a network computing system on which the method 500 operates includes a network adapter that transmits and receives data via a transport protocol, a memory device that at least temporarily stores data received at the network adapter, and a processor that processes at least some of the received data, including: applying one or more transport protocol heuristics to selective acknowledgement (SACK) messages received at the network adapter from a network node, where the transport protocol heuristics identify one or more threshold values for operational functions that are performed when processing the SACK messages, determining, by applying the one or more transport protocol heuristics to the SACK messages received from the network node, that the threshold values for one or more of the transport protocol heuristics have been reached; and in response to determining that one or more of the threshold values have been reached, identifying the network node as a security threat and taking one or more remedial actions to mitigate the security threat.

A corresponding non-transitory computer-readable medium includes one or more computer-executable instructions that, when executed by at least one processor of a computing device, cause the computing device to: apply one or more transport protocol heuristics to selective acknowledgement (SACK) messages received at the network adapter from a network node, where the transport protocol heuristics identify one or more threshold values for operational functions that are performed when processing the SACK messages, determine, by applying the one or more transport protocol heuristics to the SACK messages received from the network node, that the threshold values for one or more of the transport protocol heuristics have been reached, and in response to determining that one or more of the threshold values have been reached, identify the network node as a security threat and take one or more remedial actions to mitigate the security threat.

Accordingly, the methods and systems described herein are capable of detecting attackers using a variety of different transport protocol heuristics. These heuristics define thresholds for certain actions that are taken when acknowledgement messages are received. Once those threshold amounts have been met, the node is identified as an attacker and is monitored for future malicious activity. If the node's activity returns to normal, that node will no longer be classified as a threat. Moreover, if the system's capacity to process messages increases or if other policy conditions are met, the threshold values may be altered and nodes that were once classified as threats are no longer classified as such. This functionality is provided without placing restrictive limits on the total number of sendmap entries or without limiting the number of sendmap entries that can be allocated with SACKs.

EXAMPLE EMBODIMENTS

1. A network computing system, comprising a network adapter that transmits and receives data via a transport protocol; a memory device that at least temporarily stores data received at the network adapter; a processor that processes at least some of the received data, including: applying one or more transport protocol heuristics to selective acknowledgement (SACK) messages received at the network adapter from a network node, the transport protocol heuristics identifying one or more threshold values for operational functions that are performed when processing the SACK messages; determining, by applying the one or more transport protocol heuristics to the SACK messages received from the network node, that the threshold values for one or more of the transport protocol heuristics have been reached; and in response to determining that one or more of the threshold values have been reached: identifying the network node as a security threat; and taking one or more remedial actions to mitigate the security threat.

2. The network computing system of claim 1, wherein applying the one or more transport protocol heuristics to the SACK messages includes incrementing one or more counters associated with the operational functions as the SACK messages are processed.

3. The network computing system of claim 2, wherein the counters indicate when the threshold values for one or more of the transport protocol heuristics have been reached.

4. The network computing system of claim 2, wherein one or more of the counters are modified upon receiving an acknowledgement (ACK) message.

5. The network computing system of claim 1, wherein the security threat comprises an attacking node that is carrying out an attack against the network computing system.

6. The network computing system of claim 1, wherein at least one of the one or more remedial actions used to mitigate the security threat comprises ignoring at least some of the SACK messages received from the network node.

7. The network computing system of claim 1, wherein at least one of the threshold values for operational functions that are performed when processing the SACK messages comprises an indication of whether an ACK position is to be moved within a sendmap.

8. The network computing system of claim 7, wherein at least one of the threshold values for operational functions that are performed when processing the SACK messages comprises a measurement of how far the ACK position is to be moved within the sendmap.

9. The network computing system of claim 1, wherein at least one of the threshold values for operational functions that are performed when processing the SACK messages comprises an indication of how many SACK messages are received within a specified time period.

10. The network computing system of claim 1, further comprising filtering the SACK messages to remove previously received SACK messages.

11. The network computing system of claim 10, wherein filtering the SACK messages further comprises removing duplicate SACK messages.

12. The network computing system of claim 10, wherein at least one of the threshold values for operational functions that are performed when processing the SACK messages comprises an indication of how many SACK messages were filtered within a specified time period.

13. A computer-implemented method, comprising: applying one or more transport protocol heuristics to selective acknowledgement (SACK) messages received at a network adapter from a network node, the transport protocol heuristics identifying one or more threshold values for operational functions that are performed when processing the SACK messages; determining, by applying the one or more transport protocol heuristics to the SACK messages received from the network node, that the threshold values for one or more of the transport protocol heuristics have been reached; and in response to determining that one or more of the threshold values have been reached: identifying the network node as a security threat; and taking one or more remedial actions to mitigate the security threat.

14. The computer-implemented method of claim 13, wherein determining that the threshold values for one or more of the transport protocol heuristics have been reached includes determining that the network node is attempting to acknowledge a plurality of send attempts to increase the size of a sendmap.

15. The computer-implemented method of claim 14, further comprising adding a decay factor to the sendmap to reduce one or more counters associated with ACK or SACK messages.

16. The computer-implemented method of claim 15, wherein the network node is identified as a security threat while ACK or SACK messages are being removed.

17. The computer-implemented method of claim 16, wherein upon determining that the threshold values are no longer met by the network node, the network node is subsequently removed from being classified as a security threat.

18. The computer-implemented method of claim 13, wherein at least one of the threshold values for operational functions that are performed when processing the SACK messages is dynamically changed based on one or more current operating conditions at the network computing system.

19. The computer-implemented method of claim 13, wherein at least one of the threshold values for operational functions that are performed when processing the SACK messages is dynamically changed based on the occurrence of a specified trigger.

20. A non-transitory computer-readable medium comprising one or more computer-executable instructions that, when executed by at least one processor of a computing device, cause the computing device to: apply one or more transport protocol heuristics to selective acknowledgement (SACK) messages received at the network adapter from a network node, the transport protocol heuristics identifying one or more threshold values for operational functions that are performed when processing the SACK messages; determine, by applying the one or more transport protocol heuristics to the SACK messages received from the network node, that the threshold values for one or more of the transport protocol heuristics have been reached; and in response to determining that one or more of the threshold values have been reached: identify the network node as a security threat; and take one or more remedial actions to mitigate the security threat.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to apply a heuristic, use the result of the transformation to identify a security threat, and store the result of the transformation to identify future security threats. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system, comprising:
    a memory; and
    a processor configured to:
        identify one or more transport protocol heuristics that are to be applied to selective acknowledgement (SACK) messages received at a network adapter from a network node, the network adapter and the network node establishing at least a first transport protocol connection among a plurality of transport protocol connections;
        apply the one or more transport protocol heuristics to the SACK messages received from the network node to determine whether at least one specified threshold value for one or more of the transport protocol heuristics has been reached, wherein the specified threshold value is specific to the first transport protocol connection, and wherein each transport protocol connection from among the plurality of transport protocol connections has a separate, specified set of threshold values; and
        upon determining that at least one of the specified set of threshold values has been reached, designate the network node as a security threat.

2. The system of claim 1, wherein the processor is further configured to take one or more remedial actions to mitigate the network node that was designated as a security threat.

3. The system of claim 2, wherein at least one of the one or more remedial actions used to mitigate the network node designate as a security threat comprises ignoring at least one of the SACK messages received from the network node that was designated as a security threat.

4. The system of claim 1, wherein determining whether the at least one specified threshold value has been reached further includes determining that the network node is attempting to acknowledge a plurality of send attempts to increase the size of a sendmap.

5. The system of claim 1, wherein applying the one or more transport protocol heuristics to the SACK messages includes incrementing one or more counters associated with one or more operational functions as the SACK messages are processed.

6. The system of claim 5, wherein the one or more counters indicate when at least one of the specified threshold values for one or more of the transport protocol heuristics has been reached.

7. The system of claim 5, wherein at least one of the one or more counters is modified upon receiving an acknowledgement (ACK) message.

8. The system of claim 1, wherein the network node that was designated as a security threat comprises an attacking node that is carrying out an attack against the system.

9. The system of claim 1, wherein the transport protocol heuristics identify one or more threshold values for operational functions that are performed when processing the SACK messages.

10. The system of claim 9, wherein at least one of the one or more threshold values for operational functions that are performed when processing the SACK messages comprises an indication of whether an ACK position is to be moved within a sendmap.

11. The system of claim 10, wherein at least one of the specified threshold values for operational functions that are performed when processing the SACK messages comprises a measurement of how far the ACK position is to be moved within the sendmap.

12. The system of claim 9, wherein at least one of the specified threshold values for operational functions that are performed when processing the SACK messages comprises an indication of how many SACK messages are received within a specified time period.

13. The system of claim 2, further comprising filtering the SACK messages to remove previously received SACK messages.

14. The system of claim 13, wherein filtering the SACK messages further comprises removing duplicate SACK messages.

15. The system of claim 13, wherein at least one of the specified threshold values comprises an indication of how many SACK messages were filtered within a specified time period.

16. A computer-implemented method, comprising:
identifying one or more transport protocol heuristics that are to be applied to selective acknowledgement (SACK) messages received at a network adapter from a network node, the network adapter and the network node establishing at least a first transport protocol connection among a plurality of transport protocol connections;
applying the one or more transport protocol heuristics to the SACK messages received from the network node to determine whether at least one specified threshold value for one or more of the transport protocol heuristics has been reached, wherein the specified threshold value is specific to the first transport protocol connection, and wherein each transport protocol connection from among the plurality of transport protocol connections has a separate, specified set of threshold values; and
upon determining that at least one of the specified set of threshold values has been reached, designating the network node as a security threat.

17. The computer-implemented method of claim 16, further comprising taking one or more remedial actions to mitigate the network node that was designated as a security threat.

18. The computer-implemented method of claim 16, wherein applying the one or more transport protocol heuristics to the SACK messages includes incrementing one or more counters associated with one or more operational functions as the SACK messages are processed.

19. The computer-implemented method of claim 16, further comprising adding a decay factor to an associated sendmap to reduce one or more counters associated with ACK or SACK messages.

20. A non-transitory computer-readable medium comprising one or more computer-executable instructions that, when executed by at least one processor of a computing device, cause the computing device to:
identify one or more transport protocol heuristics that are to be applied to selective acknowledgement (SACK) messages received at a network adapter from a network node, the network adapter and the network node establishing at least a first transport protocol connection among a plurality of transport protocol connections;
apply the one or more transport protocol heuristics to the SACK messages received from the network node to determine whether at least one specified threshold value for one or more of the transport protocol heuristics has been reached, wherein the specified threshold value is specific to the first transport protocol connection, and wherein each transport protocol connection from among the plurality of transport protocol connections has a separate, specified set of threshold values; and
upon determining that at least one of the specified set of threshold values has been reached, designate the network node as a security threat.

\* \* \* \* \*